United States Patent Office 2,873,577
Patented Feb. 17, 1959

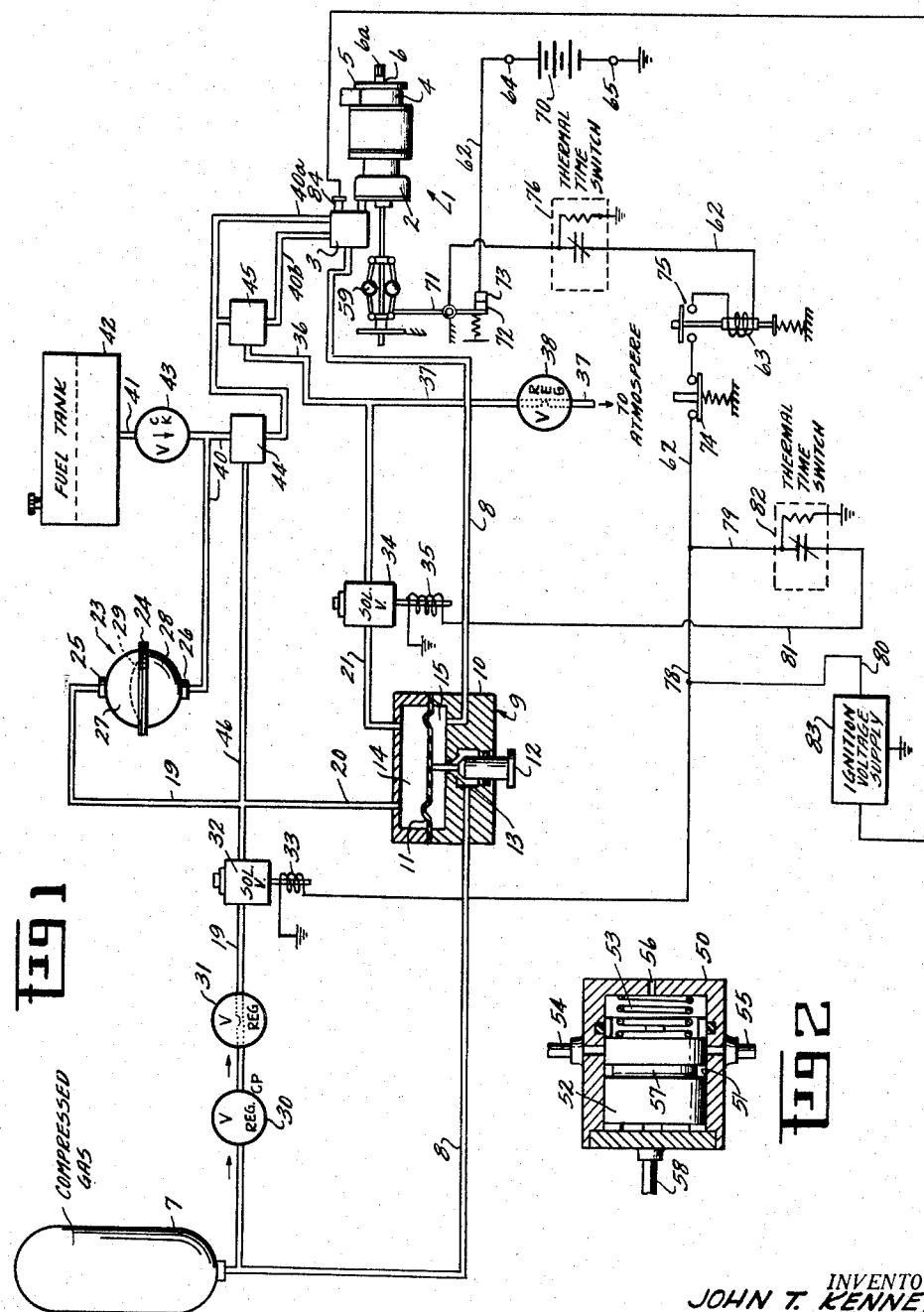

2,873,577

COMBUSTION SYSTEM FOR JET ENGINE STARTERS

John Terence Kenney, North Reading, Mass., and Sooren Edward Gamarekian, Schenectady, N. Y., assignors to General Electric Company, a corporation of New York Application May 9, 1955, Serial No. 507,012

7 Claims. (Cl. 60—39.14)

This invention relates to combustion systems and is particularly directed to a combustion system for a turbine type starter motor for starting internal combustion engines.

The invention may be used with any fuel combustion system although it is particularly adapted to those which are used to provide motive fluid for turbines used to drive aircraft accessories. In this kind of system a hydrocarbon fuel, usually that used by the aircraft power plant, is mixed with compressed air or any other oxidizer supplied under pressure to a combustion chamber wherein the mixture is burned and the products of combustion are used as motive fluid for a turbine. Although the present invention is useful in any bi-fluid combustion system, the description herein is limited to a system which uses jet engine fuel and compressed air to supply motive fluid for a turbine type starter for the main propulsion engine of an aircraft.

One of the major problems encountered in combustion systems of this type is to obtain reliable ignition of the fuel-air mixture in the combustion chamber at low temperatures in the order of —65° F. Experimentation has shown that for a given combustion chamber configuration, reliable ignition can be obtained over a wide range of ambient temperatures when a fuel-air mixture within a definite range of ratios of the quantity of fuel to that of combustion supporting fluid is used. In a specific application using jet fuel and air, this ratio was determined to be from .12 to .14 in terms of weight. Although a fuel-air ratio in this range provides good ignition characteristics, the gas temperatures obtained from combustion of a mixture of those proportions does not usually correspond to that desired during normal combustion. Also, the quantity of fuel in the mixture exceeds that which can be completely burned by the quantity of air present so that the unburned fuel in the gases leaving the turbine when mixed with the surrounding atmosphere provides an explosive mixture which could be hazardous especially when, as often is the case, the turbine exhaust gases are ducted into the air intake of the main power plant. Accordingly, it is usually desirable to maintain a relatively fuel-rich mixture during ignition only and a leaner mixture for normal burning after ignition has been accomplished. It has also been determined that reduced quantities of flow of the combustible mixture aids ignition in that for a given size of combustion chamber, the velocity of the combustible mixture in the chamber is lower making it more readily ignitable and the resulting amount of fluid expended in igniting the mixture is lessened which is a very important consideration in airborne application where weight is important. A second advantage in utilizing reduced flow rates during the ignition period is that the corresponding reduced pressure level in the ignition zone is more conducive to successful spark ignition, the problem of obtaining a suitable spark for ignition purposes becoming increasingly difficult at higher pressure levels. Still another advantage in utilizing reduced flow rates during the ignition period is that when the system is used with a gas turbine starter the starter turbine produces a reduced output torque during this period, which provides a much "softer" clutch engagement than if full flow were used immediately.

Accordingly, it is an object of the present invention to provide a fuel supply system which will provide suitable ignition over a wide range of ambient temperatures.

Another object of the invention is to provide an improved fuel supply system which will provide a fuel and combustion supporting fluid mixture suitable for ignition and thereafter supply a fuel and combustion supporting fluid mixture suitable for continued operation.

A further object of the invention is to provide an improved combustion system for turbine type starting motors which is mechanically simple and light in weight and yet reliable and efficient.

Briefly these objects are accomplished by providing a combustion system comprising means to supply a flow of a mixture of fuel and combustion supporting fluid during an ignition period which is smaller in magnitude and different in proportions than that supplied during normal operation thereafter.

Other objects and advantages will be apparent from the following description taken in connection with the accompanying drawing in which Fig. 1 is a diagrammatic representation of a turbine type starter motor provided with a fuel feeding system in accordance with the present invention; and Fig. 2 is a diagrammatic representation of a preferred form of fuel shutoff valve which may be used in practicing the invention.

Referring to the drawing, a gas turbine type starter is indicated generally at 1. The starter comprises a turbine section 2, a combustion chamber 3, and a clutch portion 4. If desired, the turbine starter may be arranged to be supported by the engine that is to start with the provision of a mounting flange 5. The turbine delivers power through reduction gearing (not shown) to the clutch 4 which is of the over-riding or unidirectional type. The driven side of the clutch is attached to a shaft member 6. Shaft member 6 is provided with a spline portion 6a for engaging an engine member (not shown) in driving relation.

The term "over-riding or unidirectional clutch" as used herein, is intended to mean any type of clutch structure for the transmission of power in one direction only. For example, clutch means 4 is intended to transmit power from the turbine 2 to the driven member 6 which in turn will drive an engine to which a starter is connected, but will not permit the transfer of power from the engine through shaft member 6 to turbine 2. Motive fluid for driving the turbine is generated in the combustion chamber 3 which delivers combustion products under pressure and at elevated temperatures to the turbine 2. The combustion products are generated by burning fuel which has been mixed with a combustion supporting fluid such as air or oxygen in the chamber 3. The air or other combustion supporting fluid may be supplied by a storage bottle 7 of a well-known type used for the storage of air, oxygen, nitrogen, acetylene, or other fluids under high pressures. Fluid communication is established between the fluid supply bottle 7 and the combustion chamber 3 by provision of a conduit 8.

Control over the flow of fluid between the storage bottle 7 and combustion chamber 3 is accomplished by provision of a main regulator valve 9 connected in series flow relation with conduit 8. The main regulator valve 9 comprises a casing 10 having a movable diaphragm 11 disposed therein separating two chambers 14 and 15. A stem member 12 bears on the diaphragm 11 and is movable therewith. A portion of the stem 12 passes through an orifice 13 which is located at the entrance to the chamber 15. The effective area of the orifice 13 is varied by motion of the stem 12 with respect thereto to regulate the pressure drop through the valve and maintain the desired pressure downstream from the valve. Two fluid conduits 20 and 21 communicate with the chamber 14. The diaphragm 11 and stem 12 are positioned so that orifice 13 is completely closed by the stem 12 when atmospheric pressure is present in the chamber 14. As the pressure in the chamber 14 is increased, the diaphragm 11 becomes deflected, causing the stem to open the orifice 13 to permit flow through the conduit 8. As increasing flow passes through the conduit 8, pressure in the chamber 15 is raised until equilibrium is reached. Thus, it will be seen that as the pressure in the chamber 14 is increased, the regulated pressure in chamber 15 is correspondingly increased.

In order to provide means for supplying fuel under pressure to the combustion chamber 3, a fuel chamber device 23 is provided. The fuel chamber device 23 is essentially a well-known type of fluid accumulator comprising an outer casing 24 having inlet and outlet ports 25 and 26 respectively. The outer casing 24 is divided into two separate chambers 27 and 28 by a movable separating means 29. Communication is established between the fluid supply bottle 7 and the chamber 27 of the fuel chamber device 23 by conduit 19.

Fluid flow in the conduit 19 is controlled by provision of a regulator valve 30, metering orifice 31, and solenoid shutoff valve 32 which are connected in series flow relation in conduit 19. As illustrated in Fig. 1, the regulator valve 30 is a constant pressure regulator which may be of any well-known type arranged to maintain the pressure at its downstream side constant irrespective of variations in the fluid supply pressure of the bottle 7. It will be recognized that the supply pressure within the bottle 7 will vary over a considerable range as fluid is drawn therefrom. The regulator valve 30 operates in combination with the metering orifice 31 to control the rate of change of pressure in conduit 19. The shut-off valve 32 is of a well-known type including a solenoid 33 to open the valve in response to an electrical voltage which may be applied to the solenoid and also including means for closing the valve when the voltage is removed or maintaining it in the closed position when no voltage is applied to the solenoid 33. Two branch conduits 20 and 46 are connected to the conduit 19 at points between the shut-off valve 32 and fuel accumulator 23. The conduit 20 provides fluid in communication between the conduit 19 and the chamber 14 of the main regulator valve 9. The conduit 46 provides fluid in communication between the conduit 19 and the actuating chamber of fuel shut-off valve 44. The chamber 14 is also connected by means of conduit 21 to solenoid valve 34 which in turn is connected to conduits 36 and 37. The conduit 37 has a metering orifice 38 connected in series flow relation therewith and is vented to the atmosphere. The conduit 36 communicates with a fuel selector valve 45 which will be described in further detail presently. The valve 34 is of a well-known type similar to the valve 32, the solenoid 35 operating in response to an electrical voltage which may be applied thereto to open the valve. Valve 34 also includes a means for returning and holding the valve in a closed position when no voltage is applied to the solenoid.

Fuel is conveyed from the chamber 28 by conduit 40 and branch conduits 40a and 40b. The branch conduits 40a and 40b conduct fuel to two separate fuel nozzles (not shown) in the combustion chamber 3. A fuel shut-off valve 44 is connected in series flow relation in conduit 40 and a fuel selector valve 45 is connected in series flow relation in conduit 40b. The fuel shut-off valve 44 and fuel selector valve 45 are fluid actuated, the valve 44 being constructed in accordance with the schematic representation of Fig. 2.

Referring to Fig. 2, the valve body 50 is provided with a central bore portion 51 within which is slidably disposed a piston 52. A biasing spring 53 is also provided with bore portion 51 to urge the piston 52 towards the left. An inlet port 54 and exhaust port 55 are provided in the valve body providing fluid communication with the internal bore portion 51 at diametrically opposed points. The cylinder 52 has an annular groove 57 which provides a fluid passage between ports 54 and 55 when aligned therewith. A port 56 at one end of the bore portion 51 is vented to atmosphere and a port 54 at the opposite end of the bore portion 51 is connected to a fluid conduit 58 through which pressurized actuating fluid is provided. It can be seen from the illustration of Fig. 2 that in the absence of pressurized actuating fluid in the supply conduit 58, the spring biasing means 53 will urge the piston 52 to the left as shown in the drawing. When pressurized actuating fluid is supplied to the valve through conduit 58, the fluid pressure acting on the adjacent surface of the piston 52 will oppose the biasing force of the spring 53 and urge the piston to the right. The valve is designed so that when the pressure of the fluid is introduced at port 58, the piston 52 will move to the right to provide fluid communication between ports 54 and 55. The fuel selector valve 45 is similarly constructed except that the annular groove 57 is positioned on the cylinder 52 so that fluid communication is normally provided between the ports 54 and 55 which is interrupted when fluid pressure is supplied through the port 58.

The fuel supply bottle 23 is preferably limited in size so as to hold only enough fuel for one or two starting cycles. Accordingly, it is necessary to refill the fuel bottle 23 frequently. This may be automatically provided for by providing a fluid conduit such as 41 between a fuel reservoir 42 and the conduit 40, or at a point between the fuel storage bottle 23 and the fuel shutoff valve 44. A fluid check valve 43 of any common design is provided in series flow relation in the conduit 41 to prevent flow from the conduit 40 back to the tank 42. The fuel reservoir 42 may be located in the system at a point higher than the fuel bottle 23 so that gravity will cause fuel to flow from the reservoir into the fuel storage bottle 23 when the system is not in operation.

A source of electrical energy shown in the drawing as a battery 70 supplies electrical energy for energizing the solenoid valves 32 and 34. In order to prevent dangerous overspeed of the turbine 2, a switch 71 of a well-known type which is normally closed and is operable in response to rotational speed of the turbine 2 opens switch contacts 72 and 73 when the operating speed of the turbine reaches a preselected value. In order to provide manual control over the operation of the turbine starter 1, manually operable switches 74 and 75 are provided. Switch 76 is a thermal time switch of any of several well-known types which has normally closed contacts which open after a voltage has been applied across its terminals for a predetermined time. Switches 71, 74, 75, and 76 are connected electrically in series with the battery 70 by conductor 62. Branch conductors 78 and 79 are connected to the conductor 62, conductor 78 being connected electrically in series with the solenoid 33 of the solenoid valve 32 and branch conductor 79 having a thermal time switch 82 connected electrically in series therewith. The thermal time switch 82 is of the same type as switch 76 having normally closed contacts which automatically open after a voltage has been applied to its terminals for a predetermined time. The switch 82 serves to control the flow of electrical energy through the conductor 79 to the solenoid 33 of the valve 32. A conductor 80 supplies electrical energy to the ignition voltage supply 83 which in turn supplies electrical energy to an ignition plug 84 of any conventional design located in the combustion chamber 3. The operation of the apparatus thus described is as follows:

Assuming that the fluid supply bottle 7 has been charged with combustion supporting fluid and that a charge of fluid fuel has been placed in chamber 28, the operator manually closes a switch 75 to put the system into operation. Since switch 75 is provided with holding coil 63, the voltage supplied to terminals 64 and 65 energizes coil 63 so that switch 75 remains in its closed position and the circuit including the battery 70 and solenoid 33 associated with the valve 32 is completed to energize the solenoid and open the valve 32. Combustion supporting fluid then flows from the supply bottle 7 through conduit 19, the pressure regulator valve 30, the metering orifice 31 to the fuel accumulator 23 and through branch conduit 20 to the chamber 14 of the main regulator valve 9. Electrical continuity is also established through conductor 79 normally closed thermal time switch 82 and branch conductors 80 and 81 thereby energizing the ignition system 83 and the solenoid 35 of the prestart solenoid valve 34. Under these conditions both solenoid operated valves 32 and 34 are in their open position so that combustion supporting fluid will flow from the supply bottle 7 through conduit 19 including the regulator valve 30, metering orifice 31, and shutoff valve 32 to the fuel accumulator 23 and through branch conduit 20 to the chamber 14 of the main regulator valve 9 and further through conduit 21 and shut-off valve 34 into atmosphere through conduit 37 and the metering orifice 38 therein. The flow of combustion supporting fluid is maintained at essentially a constant value by regulator valve 30 and metering restriction 31 and the pressure in the chamber 14 of the main regulator valve 9 is determined by the pressure drop of this flow through the metering restriction 38 in flowing to atmosphere. This pressure in the chamber 14 of the regulator valve 9 operates on the diaphragm 11 causing a displacement thereof moving the stem 12 downward so as to open a spacing between the stem 12 and the orifice 13. As the stem member 12 moves downward, the opening 13 or orifice 13 opens allowing combustion supporting fluid to flow through the storage bottle 7 through conduit 8 and the chamber 15 of the regulator valve 9 to the combustion chamber 3. As flow passes through the conduit 8, a pressure will be built up in the chamber 15 of the main regulator valve 9 which acts on the diaphragm 11 to oppose the pressure in the chamber 14. It will be apparent to those skilled in the art that the pressure of the combustion supporting fluid in the conduit 8 downstream from the regulator valve 9 will be maintained at a constant value by the main regulator valve. The pressure of the combustion supporting fluid in conduit 19 operates against the diaphragm 29 in the fuel storage bottle 23 creating a pressure on the fuel in the chamber 28 of the fuel storage bottle 23. Pressure in the conduit 46 actuates the fuel shutoff valve 44 causing it to open and the pressure in conduit 36 operates to close the fuel selector valve 45 so that the combustion supporting fluid entering the chamber 27 of the fuel accumulator forces fuel to flow through the conduits 40 and 40a to the combustion chamber 3. Thus a mixture of fuel and air is injected into the combustion chamber. The system parameters are so selected so that the ratio of fuel to air in the mixture is at a value conducive to combustion or ignition. Also, the pressure level in the combustion chamber 3 is maintained in the range of 50 to 60 pounds per square inch gage (p. s. i. g.) which is conducive to spark ignition. During this period electrical continuity is also established through conductor 80 to the ignition voltage supply 83 to energize the ignition plug 84 to provide a suitable ignition spark. Under these conditions ignition should be accomplished and suitable combustion established within the combustion chamber within a period of one to three seconds. Accordingly, the time switch 82 is calibrated to open after a period of three seconds to de-energize the solenoid valve 34 causing it to close. When the solenoid valve 34 closes, the flow of combustion supporting fluid through the metering orifice 38 is interrupted so that the pressure within the chamber 14 of the main regulator valve is increased. The increase in pressure in the chamber 14 causes increased deflection of the diaphragm 11 so that the equilibrium pressure in the conduit 8 downstream from the main regulator valve 9 is correspondingly increased. Thus the pressure and flow quantity of flow of combustion supporting fluid supplied to the combustion chamber are increased. Closure of the solenoid valve 34 also causes the fluid pressure in the conduits 36 to drop to atmospheric pressure so that the fuel selector valve 45 will open and allow fuel to flow not only through conduit 40a but also through conduit 40b to the combustion chamber 3. Thus with the quantity of fuel and air supplied to the combustion chamber 3 greatly increased, the pressure level will correspondingly be increased. The pressure level in the chamber 3 and fuel-air ratio of the mixture are designed to supply a suitable pressure and temperature for the most efficient turbine operation. Experience has shown that a pressure of 300 to 500 p. s. i. g. at the turbine inlet is suitable for satisfactory turbostarter operation. The ratio of the quantity of fuel to air in the mixture during this major portion of the starting cycle is selected to provide maximum temperature to permit maximum energy output to the turbine consistent with the limitation of the materials of construction therein. Assuming that stoichiometric burning produces temperatures too high to be consistent with the material limitations of the turbine, an excess of air is provided in order to provide a cooler temperature rather than an excess of fuel since the latter would create or provide a mixture which when mixed with air in exhausting from the turbine would be explosive. After a suitable period of time is elapsed in which the starter has brought the engine up to its desired starting speed, the time switch 76 opens interrupting electrical continuity between the source of electrical energy 70 and the main solenoid 33 associated with the main solenoid valve 32 causing the valve to close. When the valve 32 closes, pressure chamber 14 of the main regulator valve 9 drops causing the diaphragm 11 to return to its original position thereby causing the stem 12 to close the orifice 13 so that flow in the conduit 8 is interrupted and the pressure in the conduit 46 drops and the fuel shutoff valve 44 is closed thereby interrupting the flow of fuel to the combustion chamber 3. Interrupting the flow of current through the holding coil 63 of the switch 75 causes it to open so that the circuit may be re-energized only by depressing the button of the switch 75 again.

In the event that an excess amount of energy is supplied to the turbine for any operating condition, turbine overspeeding is prevented by the speed responsive governor or device 59 which will open switch 71 and contacts 72 and 73 thus de-energizing the holding coil 63 to open the switch 75 in advance of the time that the thermal time switch 82 would ordinarily open the switch 75.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent of the United States is:

1. In a fluid feeding system for a combustion chamber, a source of pressurized combustion supporting fluid, first conduit means connecting said source and said combustion chamber including main regulating valve means for controlling the flow of fluid therethrough in proportion to fluid pressure supplied to a chamber therein, a source of pressurized fuel, second conduit means connecting said source of pressurized fuel and said combustion chamber, a normally closed fuel shutoff valve in series flow relationship with said second conduit means including means to open it in response to a fluid pressure supplied to a chamber therein, a fuel selector valve to control the rate of fuel flow through said second conduit means to said combustion chamber in response to a fluid pressure applied to a chamber therein, third conduit means connecting said source of pressurized combustion supporting fluid to said main regulating valve means chamber, regulating means connected in fluid communication with said third conduit means and said main regulating valve means chamber to selectively maintain the fluid pressure in said main regulating valve means chamber at either of two preselected values, fourth conduit means connecting said source of pressurized combustion supporting fluid and said fuel shutoff valve chamber, first control valve means for controlling simultaneously the flow of combustion supporting fluid through said third and fourth conduit means to open said fuel shutoff valve and actuate said regulating means to maintain the pressure in said main regulating valve means chamber at one of said preselected values, fifth conduit means connecting said source of combustion supporting fluid and said fuel selector valve chamber, and control means including second control valve means connected to said fifth conduit means to simultaneously control the flow of fluid therethrough and actuate said regulating means to maintain the second of said preselected values of pressure in said main regulating valve means chamber.

2. Apparatus in accordance with claim 1 including timing means to actuate said control means after said first control valve means has been open a predetermined period of time.

3. A combustion system comprising a combustion chamber having an inlet for combustion supporting fluid and at least one inlet for fuel, first conduit means connecting said combustion supporting fluid inlet and a source of pressurized combustion supporting fluid, second conduit means connecting said fuel inlet and a source of pressurized fuel, pressure regulating means connected to said first conduit means to maintain the pressure of fluid at said combustion supporting fluid inlet at either of two preselected values while said fluid is flowing to said combustion supporting fluid inlet, valve means connected to said second conduit means to vary the total supply of fuel from said source of pressurized fuel to said combustion chamber, and control means connected to said pressure regulating means and said valve means and responsive to a control signal to simultaneously actuate said pressure regulating means to select one of said pressure values and actuate said fuel valve means.

4. Apparatus in accordance with claim 3 wherein said control means include means to simultaneously select the higher of said pressure values and actuate said valve means to its full open position.

5. A combustion system comprising a combustion chamber having an inlet for combustion supporting fluid and a pair of inlets for fuel, first conduit means connecting said combustion supporting fluid inlet and a source of pressurized combustion supporting fluid, second conduit means connecting said fuel inlets and a source of pressurized fuel including two branch conduits connected to said fuel inlets, regulating means in series flow relation with said first conduit means for maintaining the pressure of combustion supporting fluid downstream therefrom at either of two preselected values, fuel selector valve means in series flow relation with one of said branch conduits and control means connected to said fuel selector valve and said regulating means to simultaneously actuate said fuel selector valve and actuate said regulating means to select one of said pressure values.

6. Apparatus in accordance with claim 5 wherein said control means include means to simultaneously open said fuel selector valve and to actuate said regulating means to select the higher of said pressure values.

7. In a fluid feeding system for a combustion chamber, a source of pressurized fuel, a source of pressurized combustion supporting fluid, first fluid conduit means connecting said source of pressurized combustion supporting fluid to said combustion chamber, a main regulator valve in series flow relation with said first conduit means for regulating the fluid pressure in said conduit means downstream therefrom in accordance with the fluid pressure in a chamber in said valve, second conduit means connecting said source of pressurized fuel and said combustion chamber, said second conduit means including a pair of branch conduits each connected to a separate inlet to said combustion chamber, a fluid selector valve in series flow relation with one of said branch conduits, said fuel selector valve including means to actuate it in response to a fluid pressure supplied to a chamber therein, control means to supply fluid from one of said sources to said regulator valve chamber at a first predetermined pressure value, and control means to simultaneously change the pressure of the fluid supplied to said pressure regulator chamber and supply pressurized fluid from said one of said sources to said fuel selector valve chamber.

References Cited in the file of this patent

UNITED STATES PATENTS

| | | |
|---|---|---|
| 2,569,887 | Goddard | Oct. 2, 1951 |
| 2,570,591 | Price | Oct. 9, 1951 |
| 2,632,294 | Wall | Mar. 24, 1953 |
| 2,637,161 | Tschinkel | May 5, 1953 |
| 2,638,739 | Barr | May 19, 1953 |
| 2,643,511 | Briggs | June 30, 1953 |
| 2,688,845 | Ostroff | Sept. 14, 1954 |
| 2,715,313 | Fleming et al. | Aug. 16, 1955 |
| 2,742,759 | Flanigen et al. | Apr. 24, 1956 |
| 2,754,657 | Ehorn | July 17, 1956 |
| 2,785,532 | Kretschmer | Mar. 19, 1957 |